(12) United States Patent
Zhu

(10) Patent No.: US 12,448,806 B2
(45) Date of Patent: Oct. 21, 2025

(54) SHADE ASSEMBLY FOR A WAGON

(71) Applicant: MAXTON ENGINEERING LTD., Central (HK)

(72) Inventor: Shou Qiang Zhu, La Verne, CA (US)

(73) Assignee: MAXTON ENGINEERING LTD., Central (HK)

( * ) Notice: Subject to any disclaimer, the term of this patent is extended or adjusted under 35 U.S.C. 154(b) by 346 days.

(21) Appl. No.: 18/191,840

(22) Filed: Mar. 28, 2023

(65) Prior Publication Data

US 2023/0383564 A1   Nov. 30, 2023

Related U.S. Application Data

(60) Provisional application No. 63/324,277, filed on Mar. 28, 2022.

(51) Int. Cl.
| | |
|---|---|
| *E04H 15/06* | (2006.01) |
| *B62B 3/02* | (2006.01) |
| *B62B 5/00* | (2006.01) |
| *E04H 15/40* | (2006.01) |
| *E04H 15/64* | (2006.01) |
| *E04H 15/32* | (2006.01) |

(52) U.S. Cl.
CPC ............... *E04H 15/06* (2013.01); *B62B 3/02* (2013.01); *B62B 5/0013* (2013.01); *E04H 15/405* (2013.01); *E04H 15/64* (2013.01); *E04H 2015/326* (2013.01)

(58) Field of Classification Search
CPC ....... E04H 15/64; E04H 15/06; B62B 5/0013; B62B 3/02
See application file for complete search history.

(56) References Cited

U.S. PATENT DOCUMENTS

| | | | | |
|---|---|---|---|---|
| D551,724 S | * | 9/2007 | Seckel | D21/536 |
| 9,145,154 B1 | * | 9/2015 | Horowitz | B62B 5/0013 |
| 9,855,962 B1 | * | 1/2018 | Chen | B62B 3/025 |
| 10,252,778 B1 | * | 4/2019 | Greer | E04H 15/54 |
| 11,001,326 B1 | * | 5/2021 | Bourassa | B62J 17/08 |
| D950,413 S | * | 5/2022 | Knapp | D12/20 |
| 11,370,467 B1 | * | 6/2022 | Horowitz | B62B 3/007 |
| 11,465,664 B1 | * | 10/2022 | Choi | B62B 3/025 |
| 2003/0073520 A1 | * | 4/2003 | Saludo | B62B 5/0013 473/474 |
| 2006/0108828 A1 | * | 5/2006 | Juola | E04H 15/06 296/159 |

(Continued)

*Primary Examiner* — Erez Gurari
(74) *Attorney, Agent, or Firm* — LIU & LIU

(57) ABSTRACT

A shade assembly for a wagon having a collapsible shade frame that transitions between an assembled state for providing shade and a disassembled state for stowing. The shade frame has at least a pair of long rods each having a distal end and a mounting end removably mountable to a mounting holder on a frame of the wagon. The long rods each has a plurality of rod sections in the disassemble state, and the rod sections are removably connected end-to-end to form corresponding long rods arranged in a cross configuration to form a support frame in the assembled state. A canopy comprising a shade material is supported on the support frame of the shade frame in the assembled state. Under the weight of the canopy, the shade frame is cantilevered at the mounting ends of the long rods by the mounting holder.

20 Claims, 18 Drawing Sheets

(56) References Cited

U.S. PATENT DOCUMENTS

| | | | |
|---|---|---|---|
| 2007/0182198 A1* | 8/2007 | Michelau | B62B 9/147 296/100.06 |
| 2007/0209693 A1* | 9/2007 | Banfill | E04H 15/06 135/88.08 |
| 2007/0296246 A1* | 12/2007 | Roseborough | B62D 63/061 296/159 |
| 2010/0156069 A1* | 6/2010 | Chen | B62B 9/142 280/639 |
| 2015/0151771 A1* | 6/2015 | Jin | B62B 5/0013 280/651 |
| 2016/0375749 A1* | 12/2016 | Byrne | B60J 7/106 296/193.12 |
| 2017/0320546 A1* | 11/2017 | Greer | E04H 15/58 |
| 2018/0057035 A1* | 3/2018 | Choi | B62B 9/26 |
| 2018/0170418 A1* | 6/2018 | Choi | C08L 63/00 |
| 2019/0185038 A1* | 6/2019 | Choi | B60B 33/02 |
| 2019/0352925 A1* | 11/2019 | Pearson | E04H 15/60 |
| 2020/0340267 A1* | 10/2020 | Zemskov | B62B 9/14 |
| 2021/0002919 A1* | 1/2021 | Camillo | B62B 5/0013 |
| 2021/0054648 A1* | 2/2021 | Knapp | E04H 15/06 |
| 2022/0315080 A1* | 10/2022 | Somheil | B62B 3/002 |
| 2022/0316230 A1* | 10/2022 | Wang | E04H 15/40 |
| 2023/0037666 A1* | 2/2023 | Yang | B62B 5/0013 |
| 2023/0192167 A1* | 6/2023 | Pang | B62B 5/0013 280/651 |
| 2023/0383564 A1* | 11/2023 | Zhu | E04H 15/64 |
| 2024/0042941 A1* | 2/2024 | Raso | A47J 37/07 |
| 2025/0034899 A1* | 1/2025 | May | E06C 1/125 |

* cited by examiner

SHADE ASSEMBLY FOR A WAGON

PRIORITY CLAIM

This application claims the priorities of U.S. Provisional Patent Application No. 63/324,277 filed on Mar. 28, 2022. This application is fully incorporated by reference as if fully set forth herein. All publications noted below are fully incorporated by reference as if fully set forth herein.

FIELD OF THE INVENTION

The present invention is directed to an accessory for a portable wagon, and in particular to a shade for a collapsible wagon that can be used to store and transport various items and the size of the wagon can be easily minimized when not in use.

BACKGROUND OF THE INVENTION

In recent years, more and more people love outdoor and recreational activities such as camping, field trips, or Bar-B-Q during their free time because many people may endure high pressure at work, and have accumulated a lot of tension and stress. Not only can these outdoor activities help people release the stress, but also improve quality of life. When people enjoy their outdoor activities, wagons or wagons are primarily used for storing and transporting food, groceries and Bar-B-Q items, and even little child can be put therein.

Throughout the time, collapsible and portable wagons have been developed so the wagons can be transported in a confined space (such as vehicle trunk), and quickly converted into a three-dimensional space supported by wheels to store and transport a plurality of items when arriving to the outdoor destination such as parks, camping site, beaches, etc. Generally, a collapsible wagon has a collapsible frame which is readily folded up into a closed position having a narrow lateral profile and folded open back into the fully open position when needed. In the fully open position the cart will structurally support a storage container full of files or other items. No tools or other means are needed to fold up the cart into the folded position or to unfold the cart back into the fully open position.

U.S. Pat. No. 10,435,055, commonly assigned to Maxton Engineering Ltd, the assignee of the present invention, discloses a compact collapsible cart or wagon that improved over the prior art collapsible wagons that have too many conjugating points that would weaken the structure of the collapsible carts, and that is inconvenient for the users to engage/disengage every conjugating points when the users want to use or store them. The inventive collapsible wagon can be stored and moved more conveniently and efficiently without putting any additional or unnecessary burden on the users. The size of the collapsible wagon can be easily minimized by collapsing its frame so that the user can easily transport the cart to any destination the user wants to go, and use the cart at the destination, such as a camping spot, park, etc. The new and improved collapsible wagon is more convenient and efficient for the users to unfold or store without putting any additional or unnecessary burden on the users.

Heretofore, various shading means had been provided for collapsible wagons. For example, see, U.S. Pat. Nos. 9,101,206; 9,145,154; 9,855,962; and D748,739. However, the shades disclosed in these patents were all provided limited to above the baskets of the wagons, so as to provide limited shade coverage on the contents of the baskets. Furthermore, the shades disclosed therein are relatively bulky, which take up room for stowing when not in use.

There remains a need for a new and improved shade for a wagon, e.g., a collapsible wagon, which provides a larger coverage beyond the footprint of the wagon and which is easy to disassemble and stowed when not in use.

SUMMARY OF THE INVENTION

The present invention overcomes the drawbacks and deficiencies of the prior art wagons with shade assemblies. The present invention is directed to a shade assembly for a wagon (e.g., a collapsible wagon) having a shade frame that can be assembled and installed/mounted to mounting holders on the frame of the wagon, such that the mounting ends of the shade frame are cantilevered by the mounting holders.

In one aspect of the present invention, the shade assembly comprises a collapsible shade frame that transitions between an assembled state for providing shade and a disassembled state for stowing. The shade frame comprises at least a pair of long rods each having a distal end and a mounting end removably mountable to a mounting holder on a frame of the wagon, wherein the long rods each comprises a plurality of rod sections in the disassemble state, and wherein the rod sections are removably connected end-to-end to form corresponding long rods arranged in a cross configuration to form a support frame in the assembled state. A canopy comprising a shade material is supported on the support frame of the shade frame in the assembled state. Under the weight of the canopy, the shade frame is cantilevered at the mounting ends of the long rods by the mounting holder.

In one embodiment, the long rods are flexible in the assembled state to allow bending/bowing to support the shade material to form generally a dome shaped canopy. Furthermore, the distal ends of the shade assembly are not supported and are free to move under the weight of the canopy supported on the shade frame. In particular, the distal ends of the long rods are not supported and are free to move under the weight of the canopy.

In one embodiment, the mounting holders are located at mounting locations aligned on a same side of the wagon. As configured, the canopy extends with the long rods cantilevered from the mounting holders at mounting locations along a same side of the wagon. The canopy has a lateral span of an area larger than a total area of the wagon footprint. In one embodiment, the mounting holders are located at rear and front frames along the same side of the wagon.

In one embodiment, the mounting holders each has a cylindrical holder that is sized to receive insertion of the mounting end of the long rod.

In one embodiment, the rod sections are coupled by a cord running through all the rod sections of the respective long rods in the disassembled state to facilitate connection of the rod sections in a specific desired order. In one embodiment, the cord is elastic.

The long rods are flexible overall, to apply biasing force on the shade material to keep it taut to form the dome shaped canopy. In one embodiment, the rod sections are made of at least one of aluminum, plastic, carbon fiber, and a combination thereof.

In one embodiment, the canopy further comprises longitudinal guides provided on the surface of the shade material, wherein a first one of the long rods is inserted through the opening in the longitudinal guides in a longitudinal direction from an edge of the shade material, diagonally across the underside and through a center portion of the shade material, and a second one of the long rods is inserted through the guides in a longitudinal direction crossing (e.g., generally orthogonal to) the longitudinal direction of the first one of the long rods, thus forming the cross configuration of the support frame for the shade material.

In one embodiment, at least one of the rod sections has at least one anchoring loop or anchoring hook, and the shade material has a corresponding anchoring hook or anchoring hoop at the edge of the shade material to keep the shade material taut to form the dome shaped canopy.

In a further embodiment, the guides for the two long rods run along a top surface or a bottom surface of the shade material.

In another embodiment, the canopy comprises at least a flap on a side for providing shading from oblique sun rays and/or providing privacy from view from a lateral side.

In another aspect of the present invention, a wagon comprises a wagon frame assembly and a shade assembly disclosed herein which is removably coupled to the wagon frame assembly.

In one embodiment, the mounting holders are provided at mounting locations of a front frame and a rear frame, which are aligned on the same side of the wagon.

In one embodiment, the wagon frame structure is collapsible into a folded structure. In one embodiment, the collapsible wagon frame assembly further comprises a collapsible frame having a front frame supporting front wheels at a base of the front frame, and a pair of side frames that are each pivotally collapsible, wherein the front frame, the rear frame and the pair of side frames in their extended state define a space for receiving a basket for holding items to be transport by the collapsible wagon.

As can be appreciated from the present disclosure including the illustrated embodiments, the present invention provides a shade assembly that can be quickly and easily assembled for use and disassembled into a compact form for storage. The frame of the shade assembly as formed by the long rods is supported to extend in a cantilevered manner, from one/same side of the wagon, providing shade coverage well beyond the footprint of the wagon. The weight of the wagon effectively acts as a support "base" for the two footings of the shade assembly formed by the ends of the long rods. Any content in the wagon would provide additional weight to hold the footings more securely.

DESCRIPTION OF ILLUSTRATED EMBODIMENT

Figure 1A:
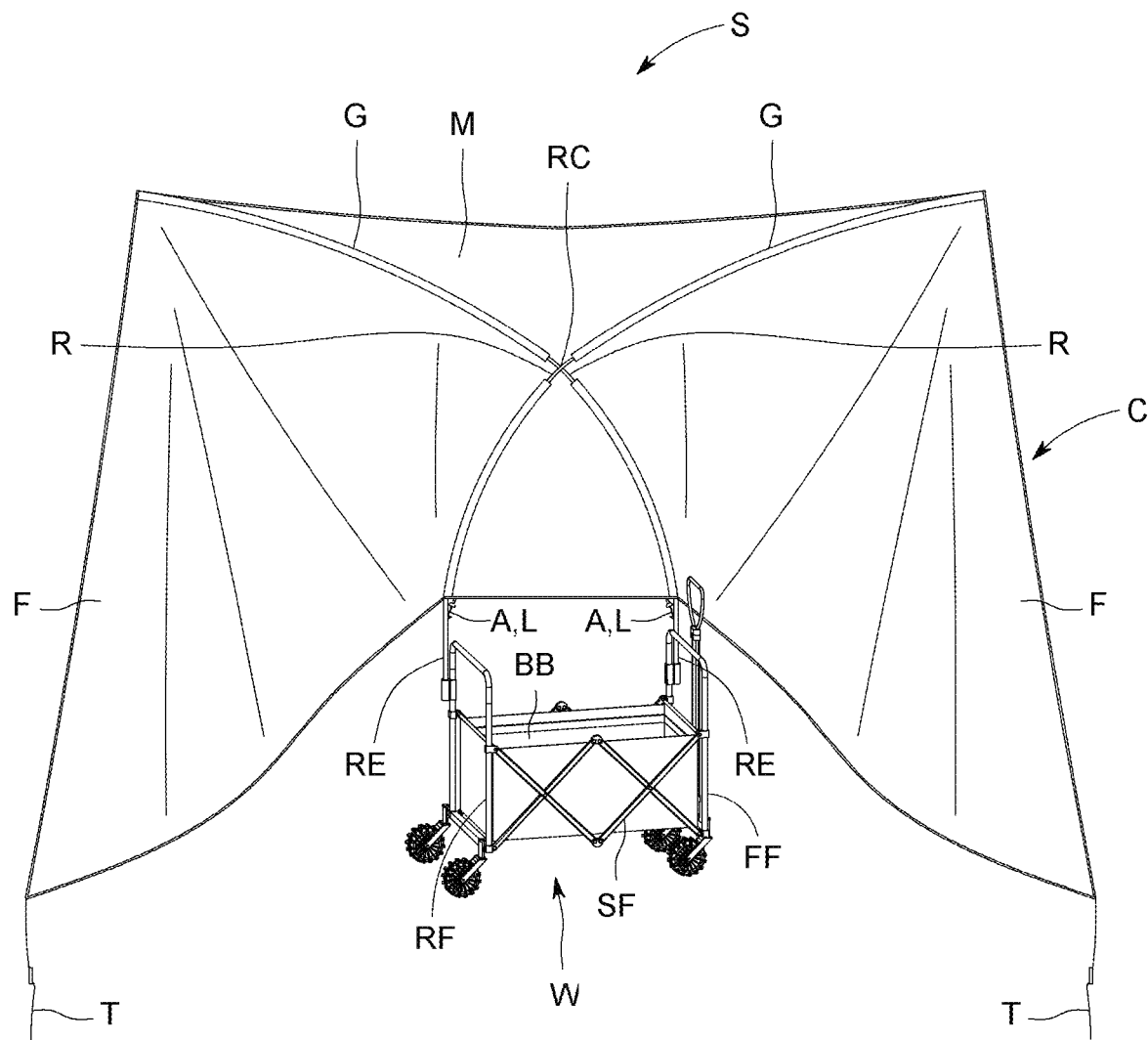
FIGS. 1A to 1D illustrate a shade assembly fully assembled and installed on a collapsible wagon, in accordance with one embodiment of the present invention.
Figure 1B:
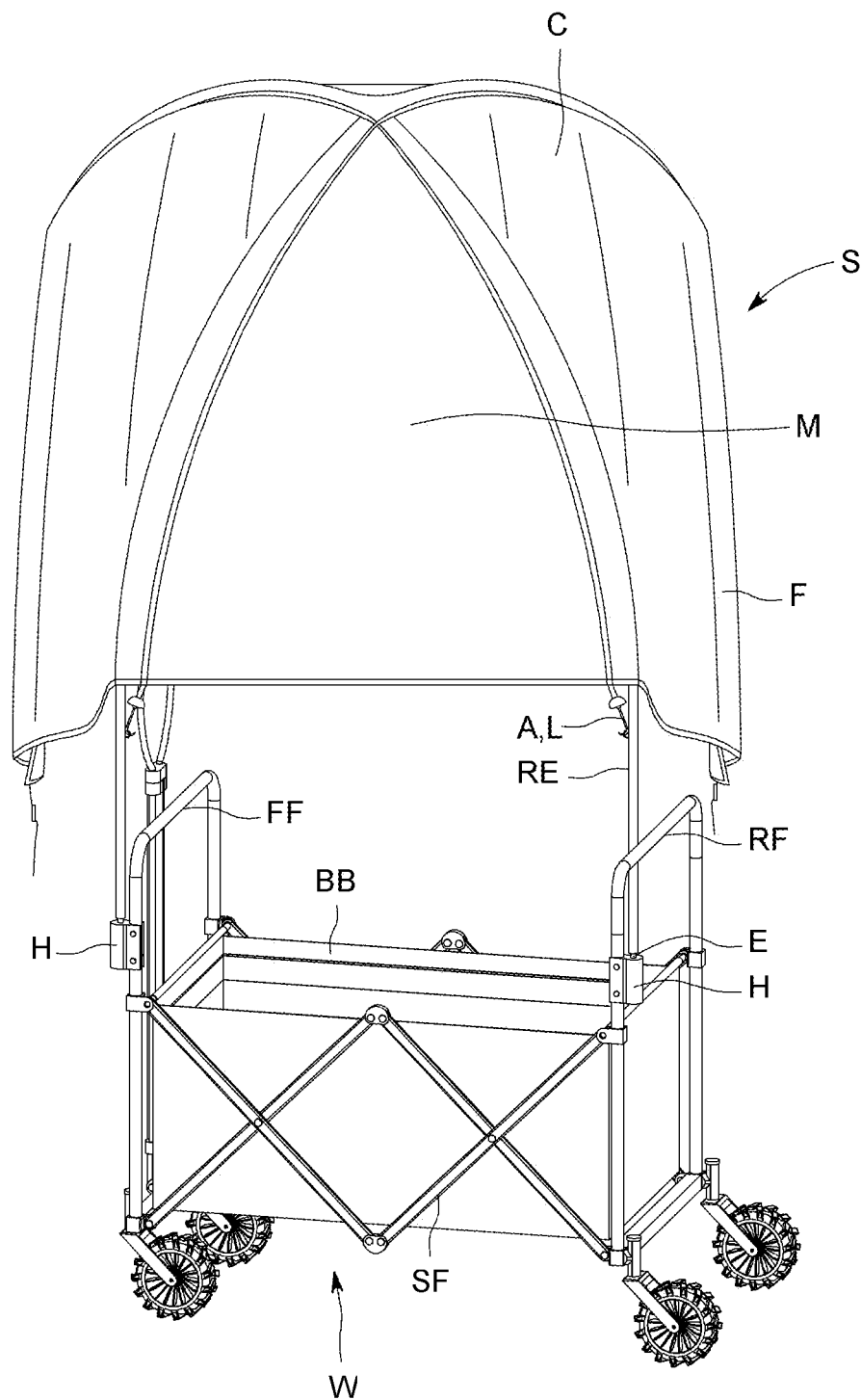
Figure 1C:
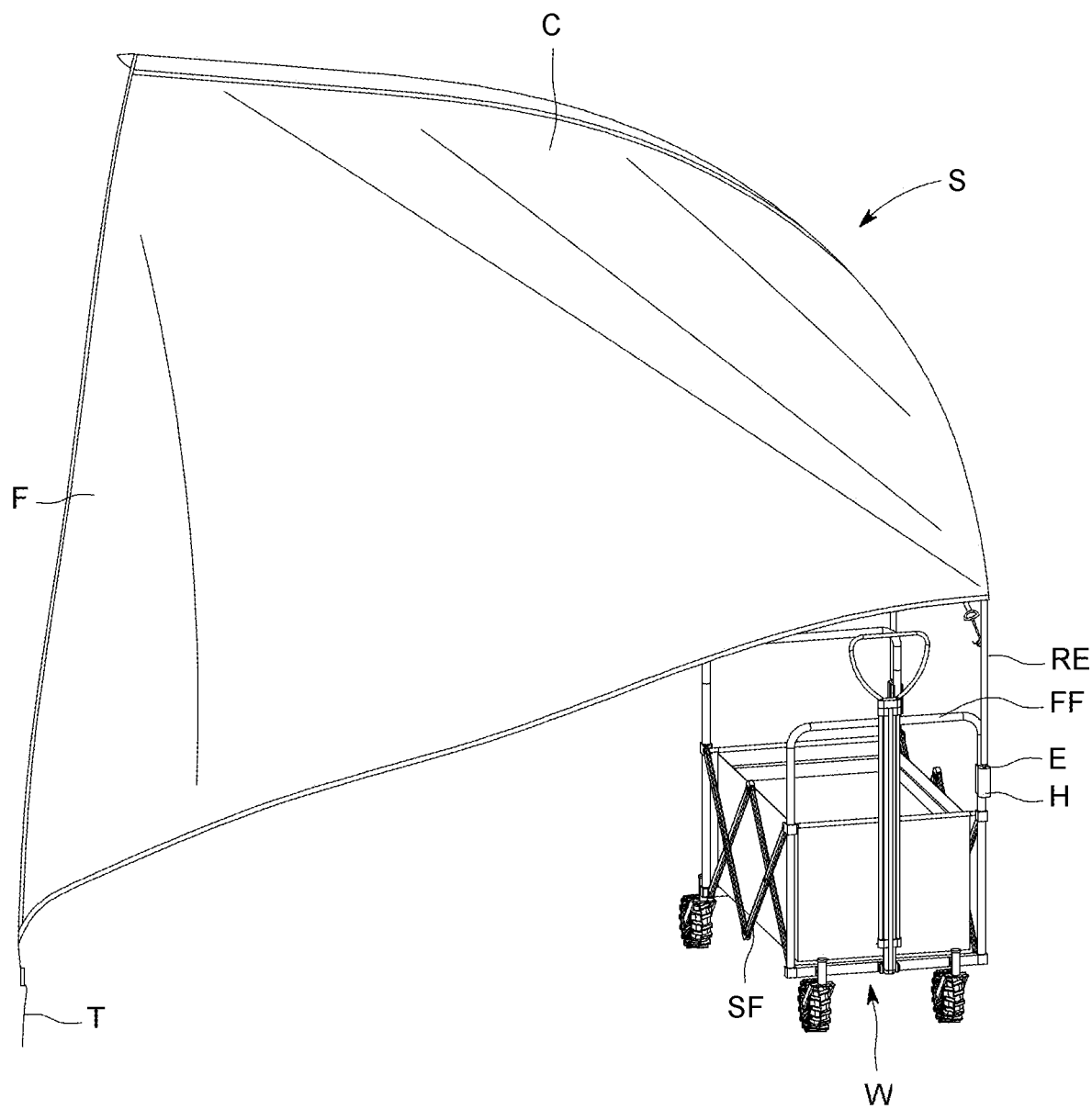
Figure 1D:
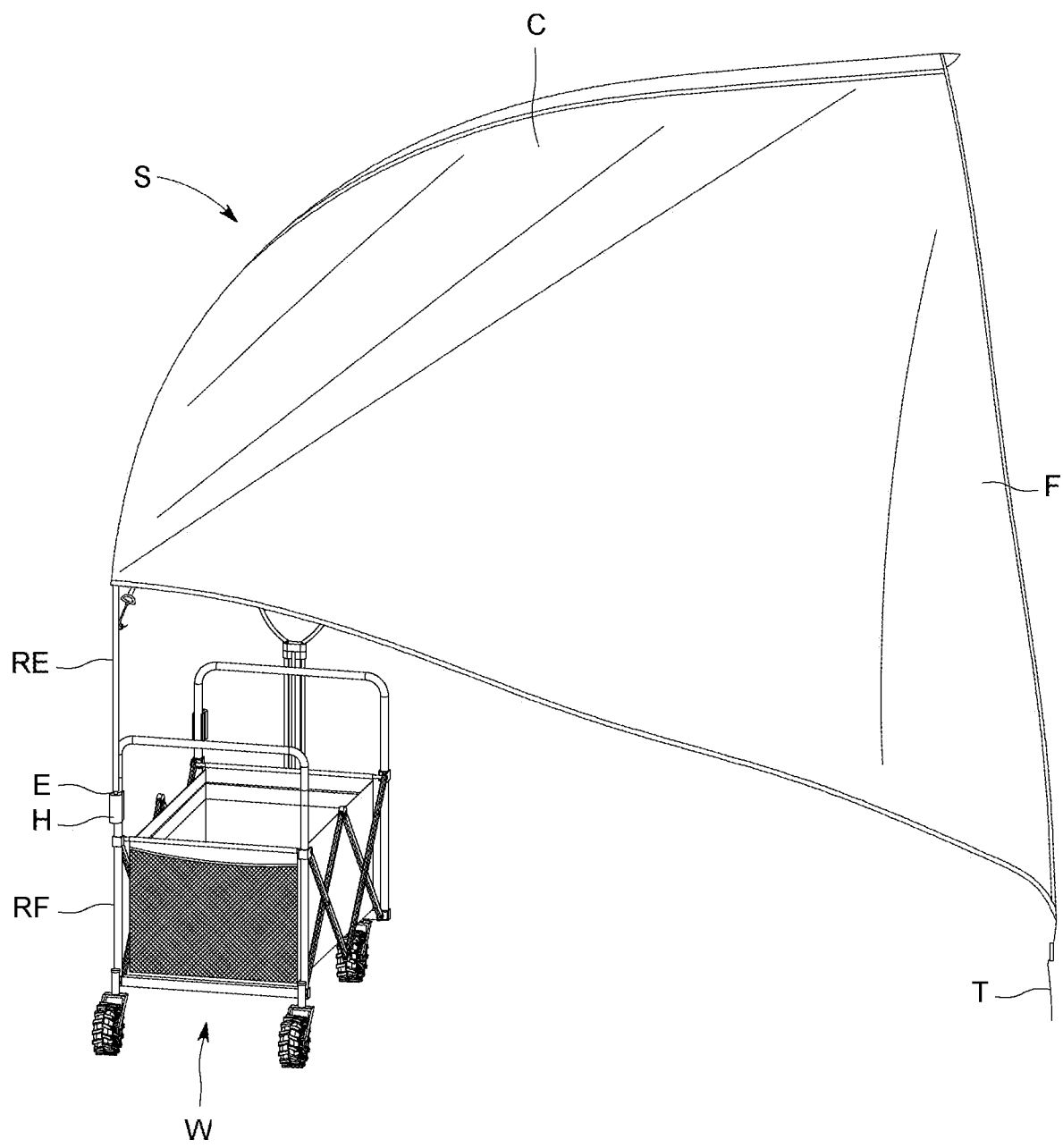

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In the illustrated embodiment, the inventive shade is described using an example of wagon W of the collapsible type (i.e., with a collapsible frame). The inventive shade assembly S can also be used with wagons that are not collapsible (i.e., with frames that are not collapsible).

A collapsible wagon W generally comprises a collapsible frame having a front frame FF supporting front wheels at a base/bottom of the front frame FF, a rear frame RF supporting rear wheels at a base/bottom of the rear frame RF, and a pair of side frames SF that are each pivotally collapsible, wherein the front frame FF, the rear frame RF and the pair of side frames SF in their extended state define a space for receiving a basket BB for holding items to be transport by the collapsible wagon W. Further reference can be made to U.S. Pat. Nos. 10,435,055 and 8,011,686 to adopt a similar structure for the collapsible wagon frame assembly, subject to modifications with the shade assembly S disclosed herein.

In use, the wagon frame assembly is extended in its fully extended/expanded configuration. If further use of a shade assembly S is desired, the shade assembly S can be assembled and installed/mounted to mounting holders H on the frame of the wagon W which are configured to receive the mounting ends E of the long rods R of the shade frame (i.e., the last rod sections RE of the long rods R), e.g., at mounting locations of the front frame FF and the rear frame RF which are on the same side of the wagon W, such that the long rods R are cantilevered at their mounting ends E by the mounting holders H.

FIGS. 1A to 1D illustrate a shade assembly S fully assembled and installed on a collapsible wagon w, in accordance with one embodiment of the present invention.

The shade assembly S is in the configuration of two long rods R that form a frame in a cross configuration RC (i.e., by crossing or intersecting the two long rods R) to support a flexible shade material M (e.g., a plastic, material, canvas, etc. material) to block sunlight, which material may be also waterproof. The long rods are flexible enough to allow bending/bowing to support the shade material M to form generally a dome shaped canopy C extending beyond the footprint of the wagon W.

In this embodiment, as illustrated, the shade assembly S in the form of the canopy C extends with the long rods R cantilevered from two mounting holders H at mounting locations only on the same side of the wagon W (e.g., at the rear and front frames only on the same side of the wagon). The mounting holders H each has a cylindrical holder that is sized to receive an inserted free end E (i.e., a mounting end) of a long rod R. The long rods R bow/bent under the weight of the canopy C with the long rods R cantilevered by the mounting holders H at the mounting ends E of the long rods R inserted into the mounting holders H (i.e., the mounting ends E are supported by the mounting holders H in a cantilevered manner). The distal ends of the long rods R, being not supported, are free to move (e.g., sway up and down and/or sideways) under the weight of the canopy C. As shown, the canopy C shades not only the contents of the wagon W, but also persons and/or items in an area outside of wagon W that is covered by the canopy C. The flaps F on the two sides provide shading from oblique sun rays, and also provide privacy from views from the lateral sides. Anchoring ties T may be provided at the extended corners, extended edges, or edges of the flaps F to facilitate anchoring of the flaps F to ground to maintain the coverage of the canopy C.

Figure 2:
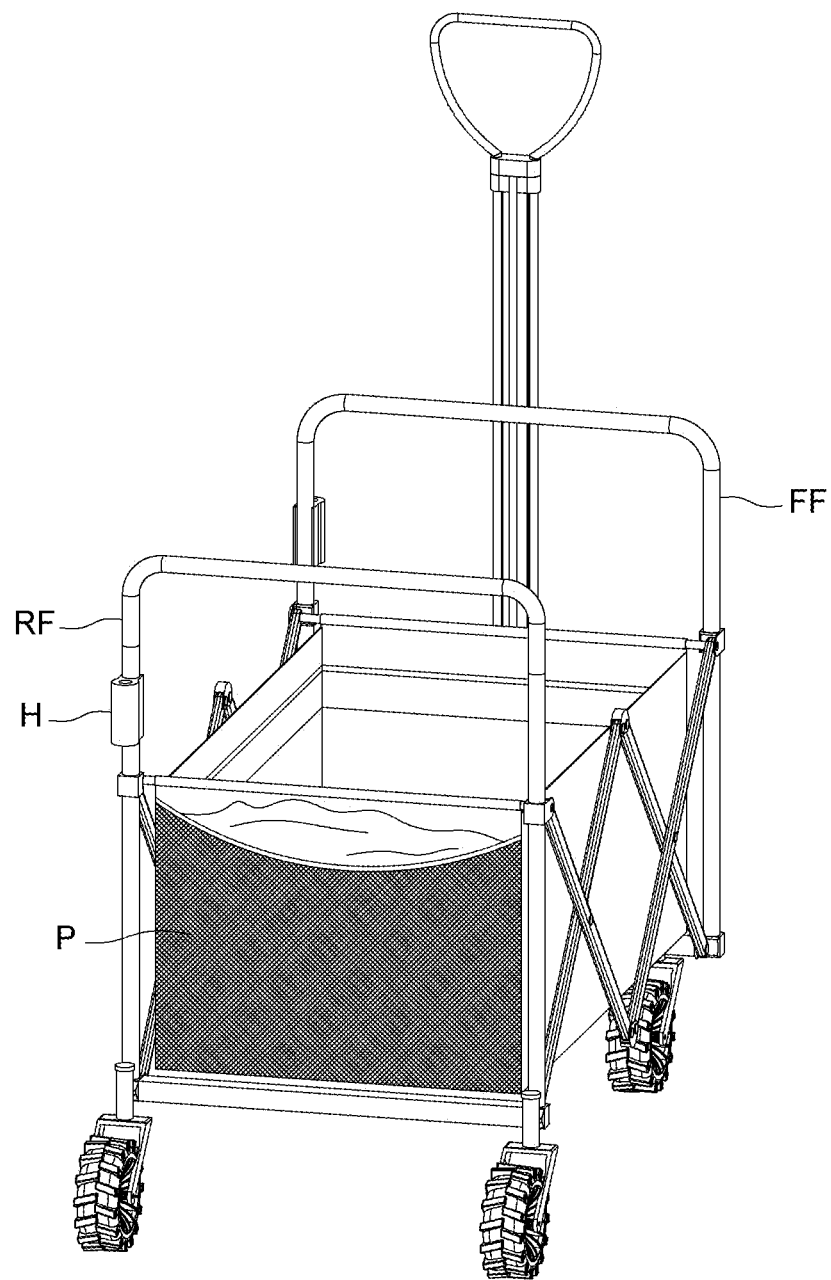
FIG. 2 depicts the shade assembly disassembled and stowed away in a pocket at the end of the wagon, in accordance with one embodiment of the present invention.

FIG. 2 depicts the shade assembly S disassembled and stowed away in a pocket P at the end of the wagon, in accordance with one embodiment of the present invention. When not in use, the shade assembly S can be disassembled and stowed away, e.g., in a mesh pocket P provided at the rear of the wagon W.

FIGS. 3A to 3E depict the sequence for assembling the shade assembly S to prepare it for installation onto the wagon W, in accordance with one embodiment of the present invention.

The long rods R each comprises hollow rod sections RS that can be connected end-to-end to form a long rod R. In the illustrated embodiment, to facilitate connection of the rod sections RS in a specific desired order, the rod sections RS may be coupled/tethered loosely by a cord CD running through the interior of all the rod sections RS of a long rod R. In the assembled state (see also, FIG. 6B), the rod sections RS are connected in an end-to-end fashion, e.g., by means of male-female friction/interference fit coupling of the ends of adjoining rod sections RS or cylindrical coupling collars connecting the ends of adjoining rod sections (i.e., adjoining ends are inserted into two ends of the cylindrical coupling collar). The cord CD could be loosely retained inside the hollow rod sections RS. In the disassemble state (shown in FIGS. 3A and 6A), the adjoining ends of the adjoining rod sections RS are separated by pulling apart, and the rod sections RS could be folded/collapsed into a bundle for stowing, with the cord organizing/keeping the rod sections RS in the desired order for future assembly.

Figure 6A:
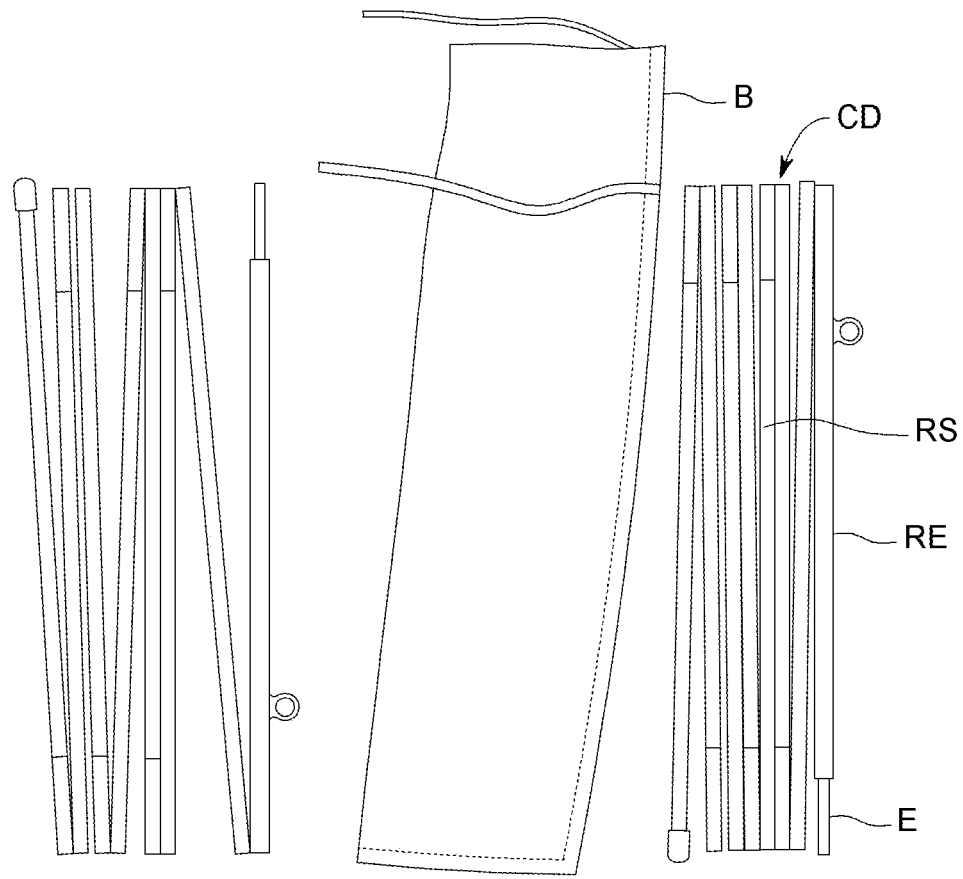
FIGS. 6A and 6B depict the rod sections connected to form the frame of the shade assembly, and the rod sections disconnected for stowing, in accordance with one embodiment of the present invention.

In an alternate embodiment, the cord CD is elastic. In the assembled state, the rod sections RS are connected in an end-to-end fashion under bias of the tension of the cord CD to maintain coupling of the adjoining ends of rod sections RS. The tension of the elastic cord CD provides sufficient bias to maintain the rod sections RS in the connected configuration, but still allows for the adjoining ends of the rod sections RS to be pulled apart from each other. In the disassemble state, the ends of the adjoining rod sections RS are pulled apart under further tension of the elastic cord CD, and the separated rod sections RS are folded to collapse into a bundle for stowing (as shown in FIGS. 3A and 6A).

In a further embodiment, the rod sections RS need not be tethered by a cord CD. The rod sections RS could be separate from each other without any tether. The rod sections RS may be labeled, or they may bear indicia that would facilitate a user to connect the rod sections RS end-to-end in a prescribed order.

Figure 3A:
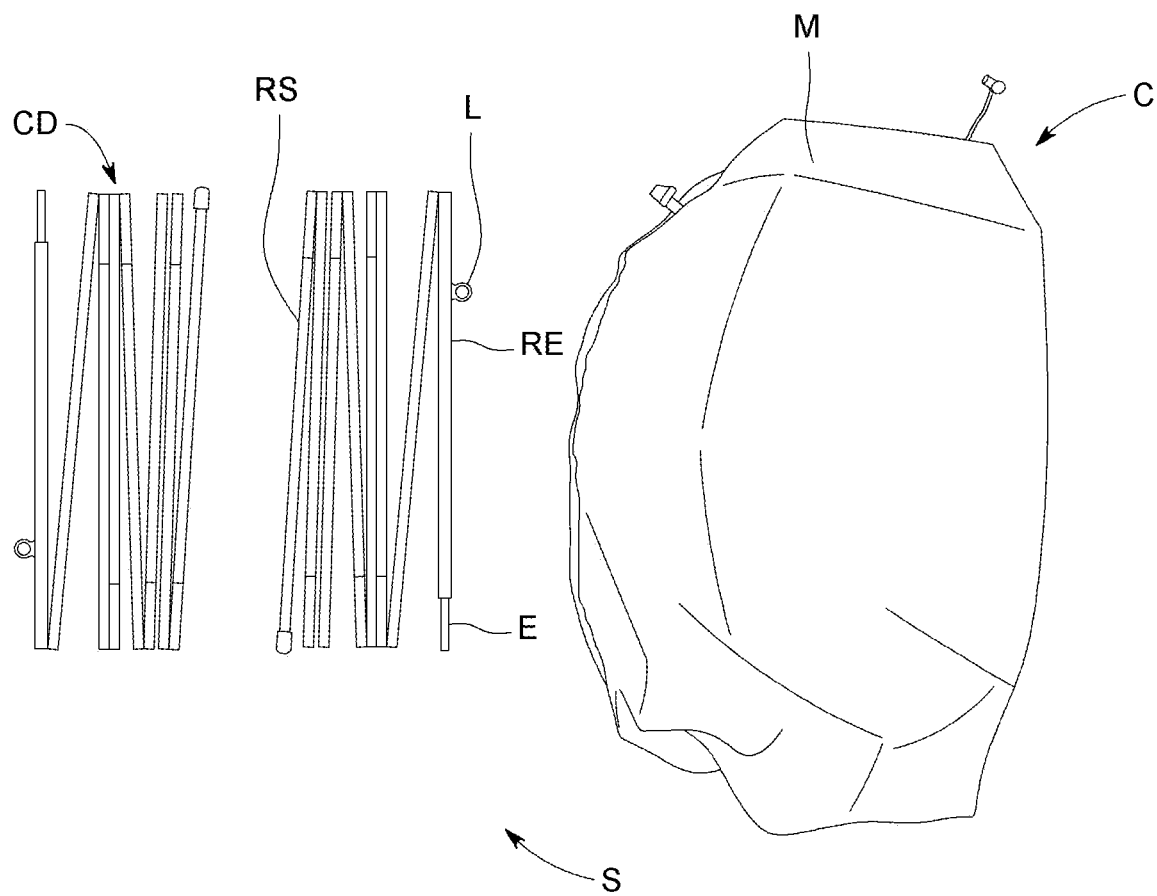
FIGS. 3A to 3E depict the sequence for assembling the shade assembly to prepare it for installing onto the wagon, in accordance with one embodiment of the present invention.
Figure 3B:
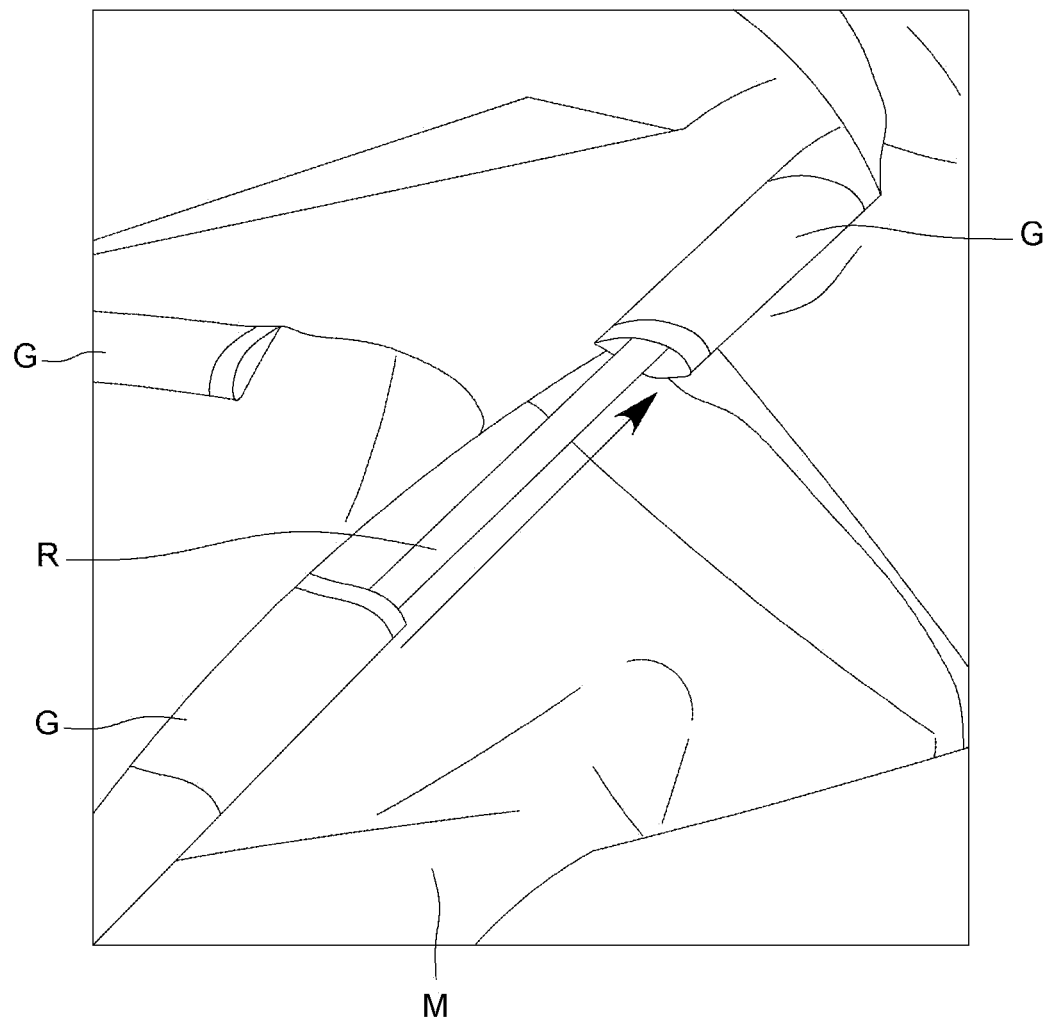
Figure 3C:
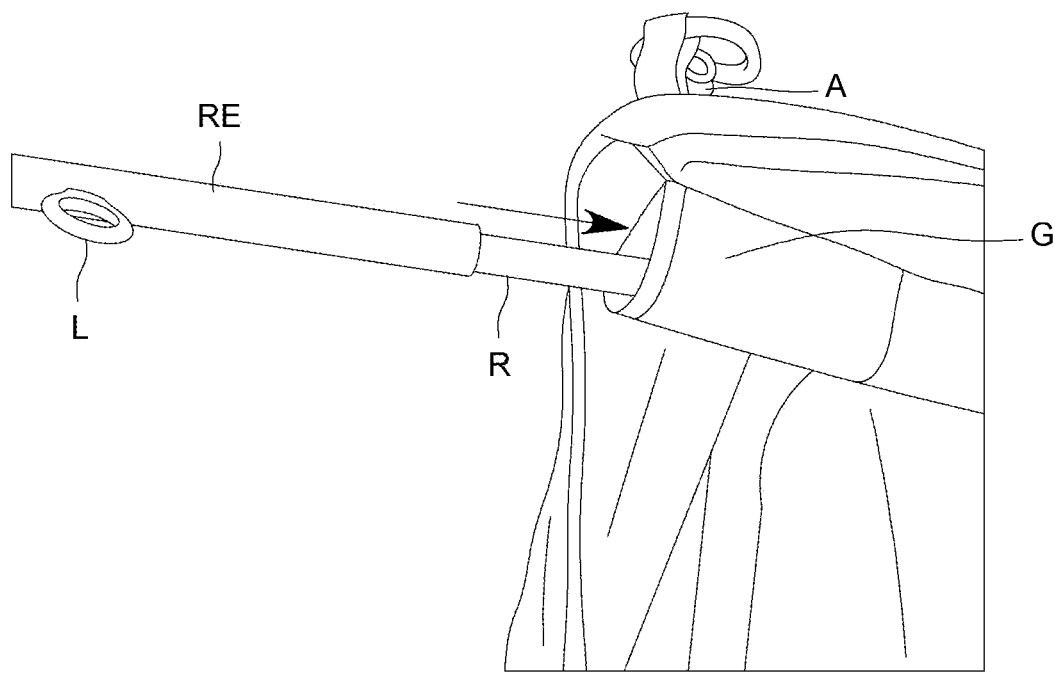
Figure 3D:
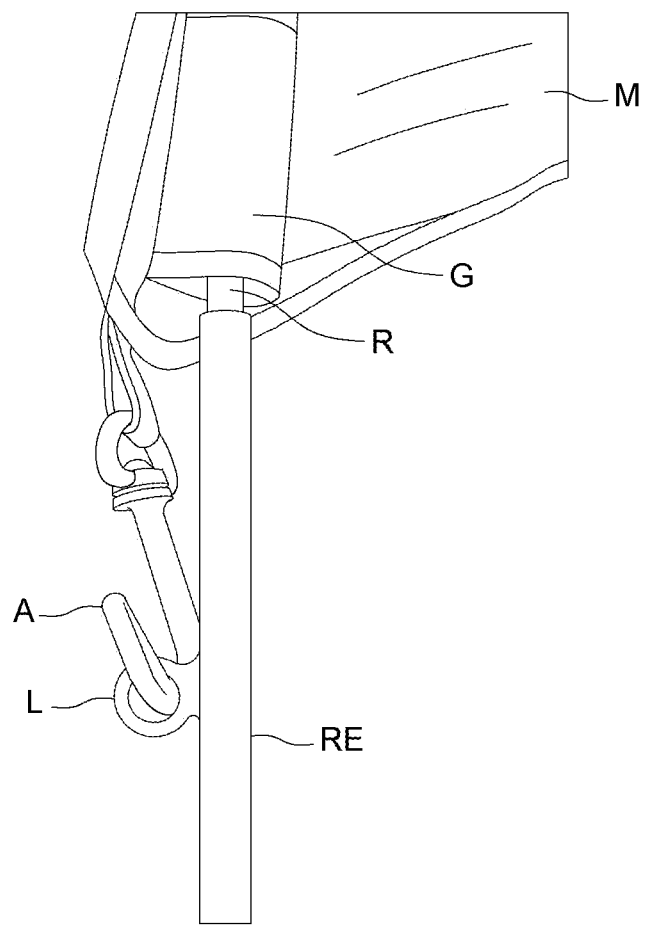
Figure 3E:
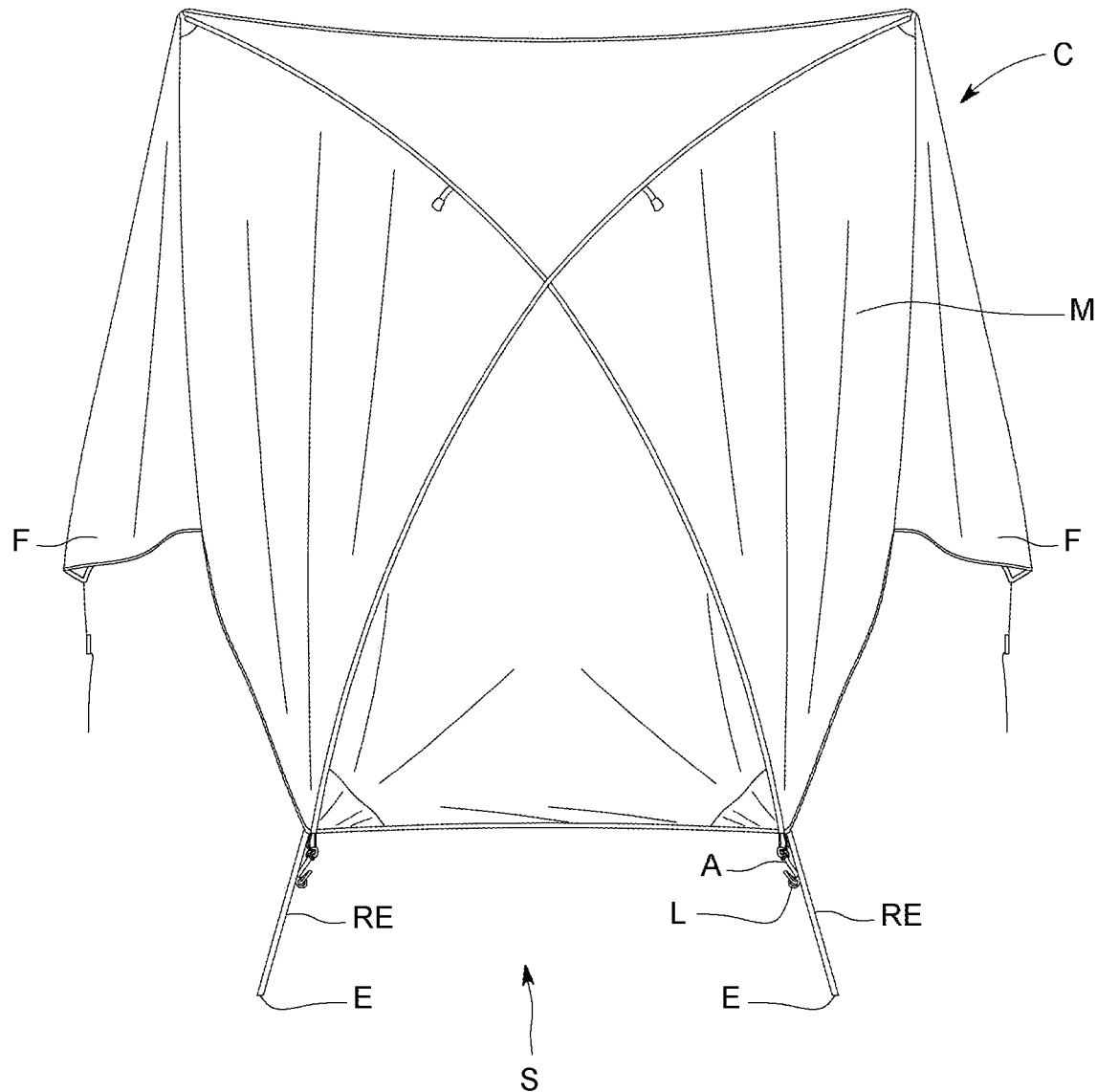

Starting from the rod sections RS depicted in FIG. 3A, they are connected end-to-end to from two long rods R. Referring to FIGS. 3B and 3C, a first long rod R is inserted though longitudinal guides G on the underside of the shade material M, from an edge of the shade material M, diagonally across the underside of the shade material M and through the center portion of the shade material M. A second long rod R is inserted through longitudinal guides G in a direction that may be generally orthogonal to the direction of the first long rod R, thus forming the cross configuration RC of the shade frame as depicted in FIG. 1A.

It can be appreciated that the cross configuration RC of the shade assembly S can be structured and configured using instead coupling collars to connect the ends of the adjoining rod sections, without departing from the scope and spirit of the present invention. The cross configuration of the long rods R may be implemented using a cross-shaped coupler coupling the ends of four sections of rods (i.e., two sections of rods coupled by the cross-shaped coupler in a same longitudinal axis is equivalent to a long rod as was in the embodiments discussed above).

The rod sections RS may be made of aluminum, plastic, carbon fiber, etc., or some combination of such. The structure of the long rod R made up of rod sections RS is similar to those found in camping tent assemblies, hiking sticks, etc. The long rods R are flexible overall, to apply biasing force on the shade material to keep it taut.

Figure 4A:
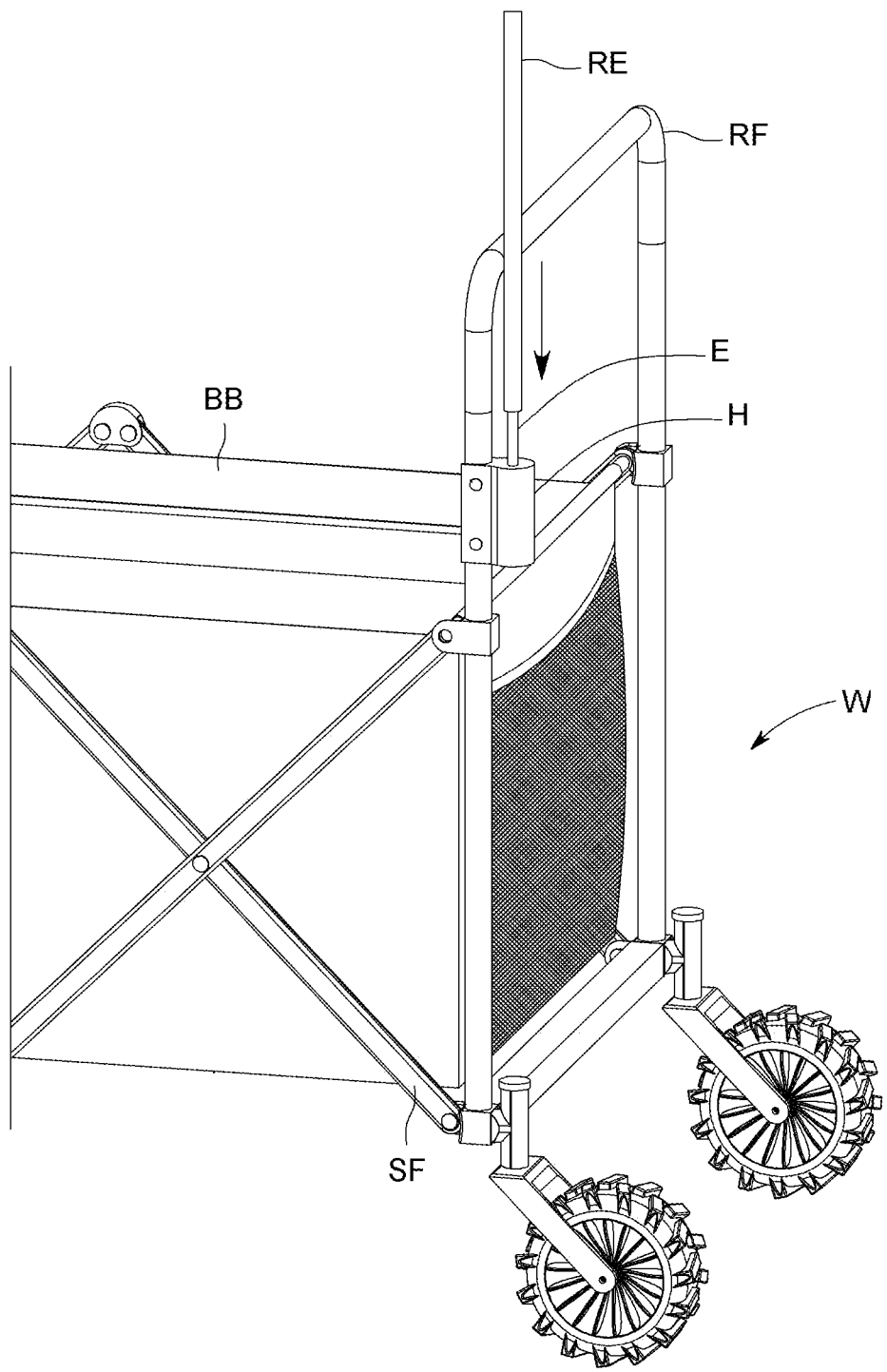
FIGS. 4A and 4B depict installing the shade assembly to the wagon, in accordance with one embodiment of the present invention.

Each long rod R has a distal end that is covered by a corner or edge of the shade material M of the canopy C, and a free mounting end E of the last rod section RE extending and exposed beyond the bottom edge of the shade material M (better seen in FIG. 3E), which mounting end E would be inserted into the mounting holders H (see, FIG. 4A). Along this rod section RE is an anchoring loop L. The shade material M has an anchoring hook A at the end of the guide G that is hooked onto the anchoring loop L. After anchoring the two anchoring hooks A each to a corresponding anchoring loop L on the free rod section RE of a corresponding long rod R, this keeps the shade material M taut to form the top of the dome shaped canopy C shown in FIG. 1. It is understood that the locations of the loop L and hook A can be swapped, i.e., the hook A being on the last rod section RE and the loop A being on the shade material M.

Figure 4B:
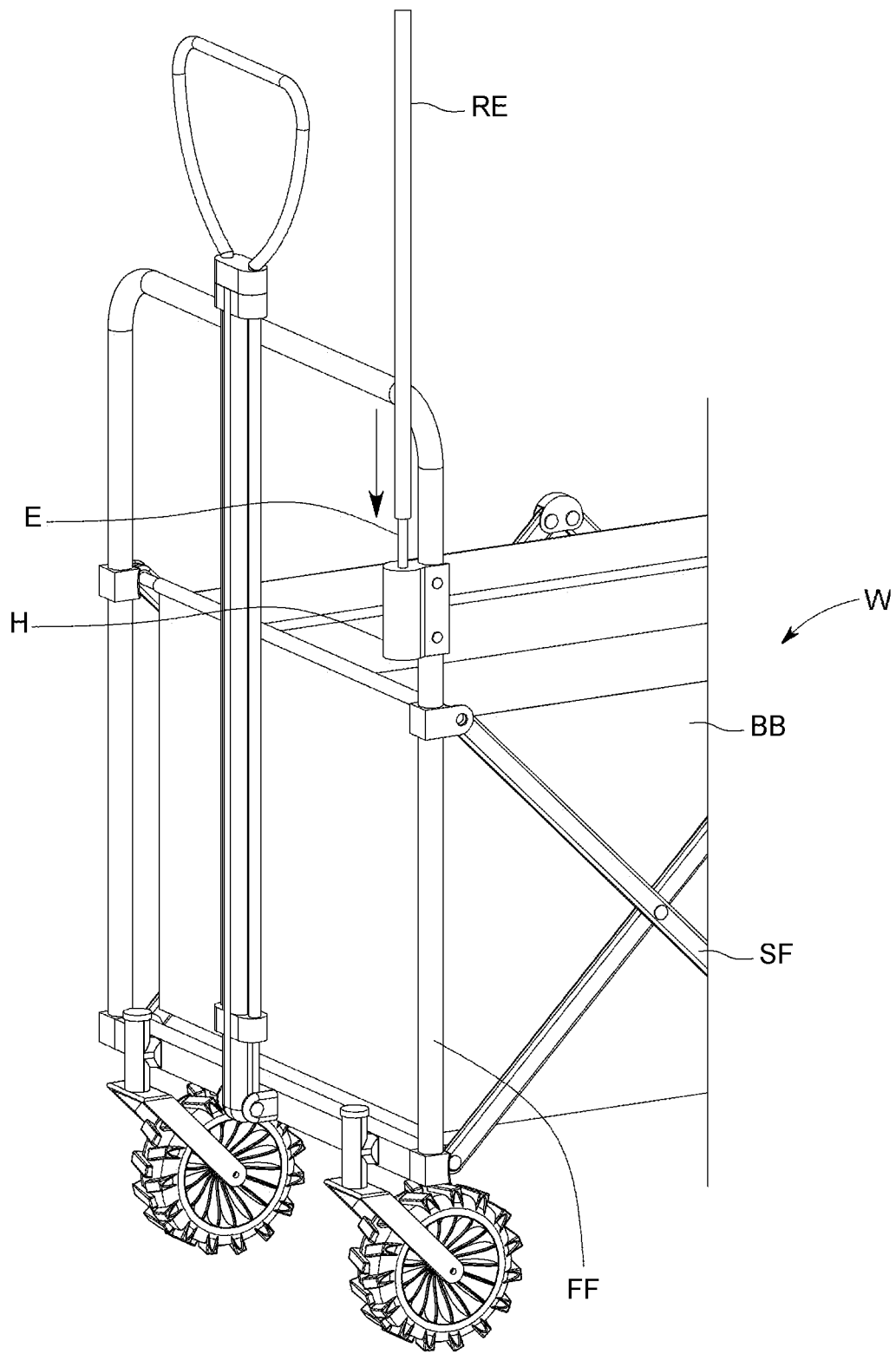
Figure 5A:
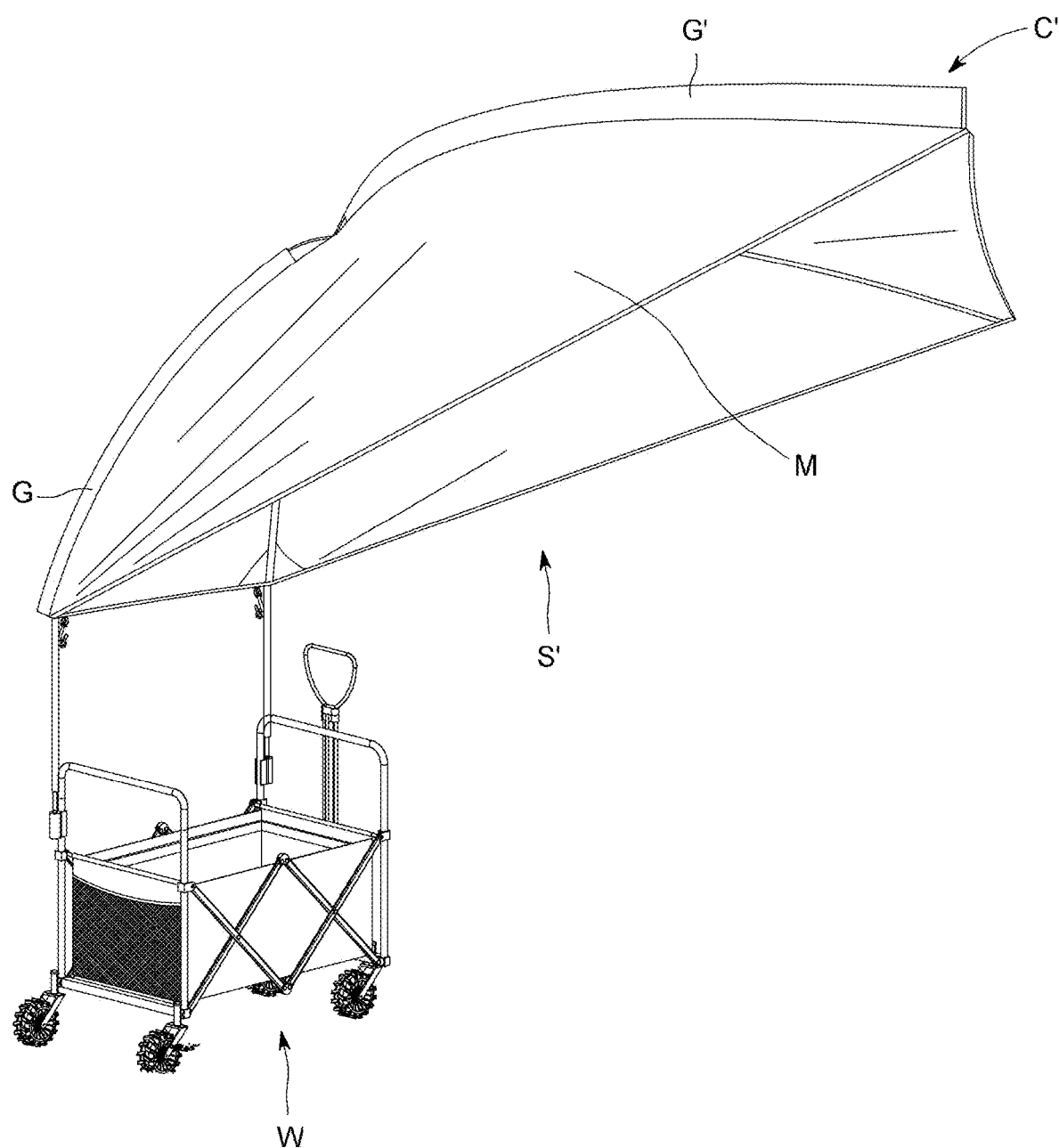
FIGS. 5A to 5D depict a shade assembly in accordance with another embodiment of the present invention.
Figure 5B:
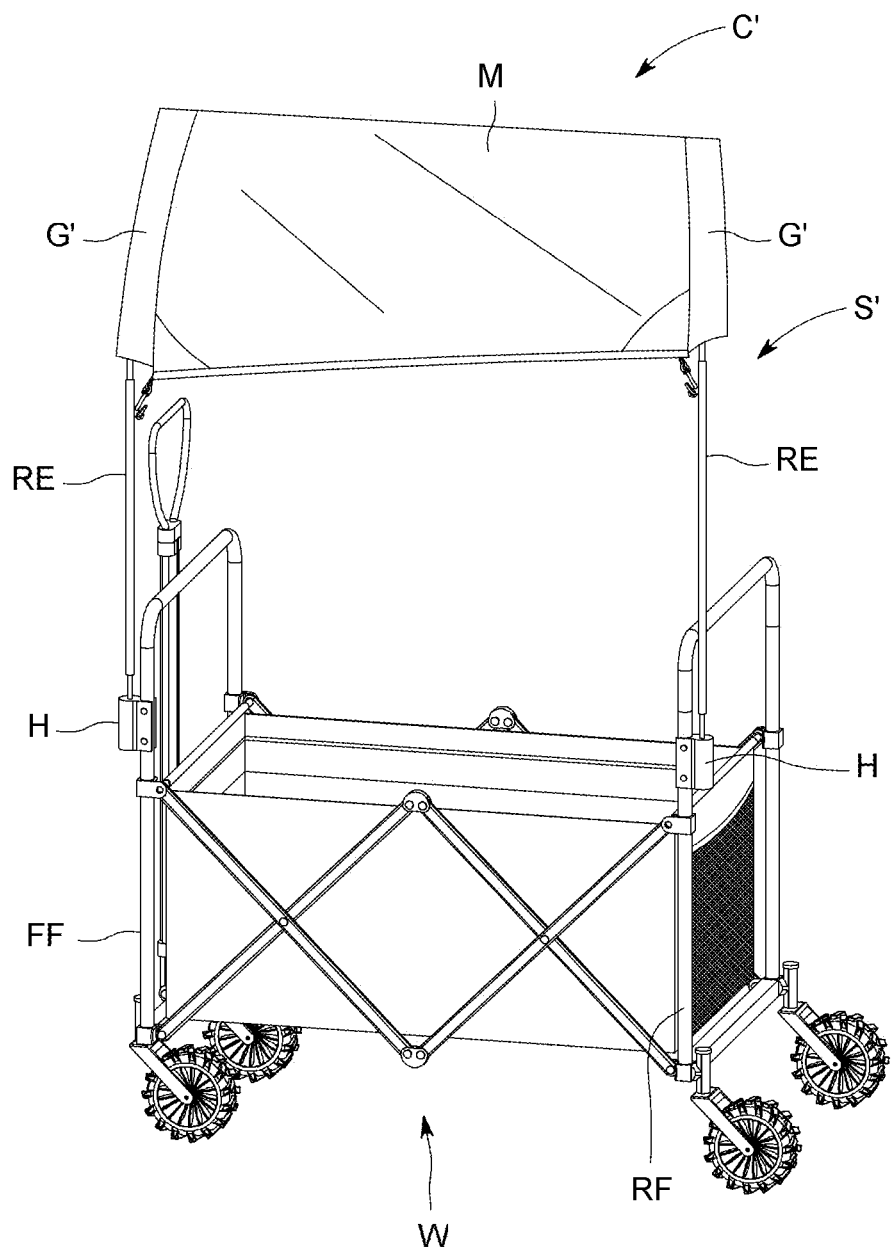
Figure 5C:
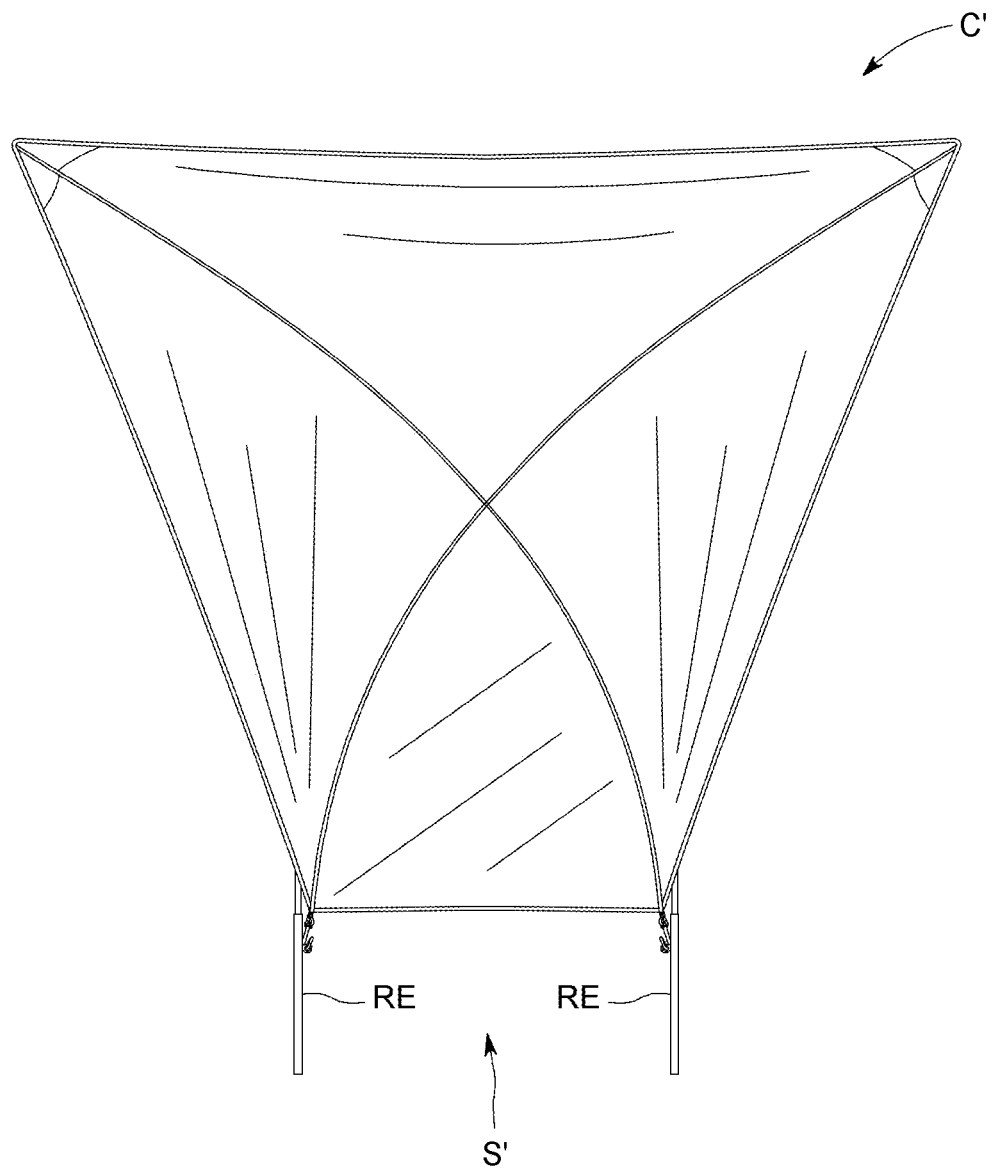
Figure 5D:
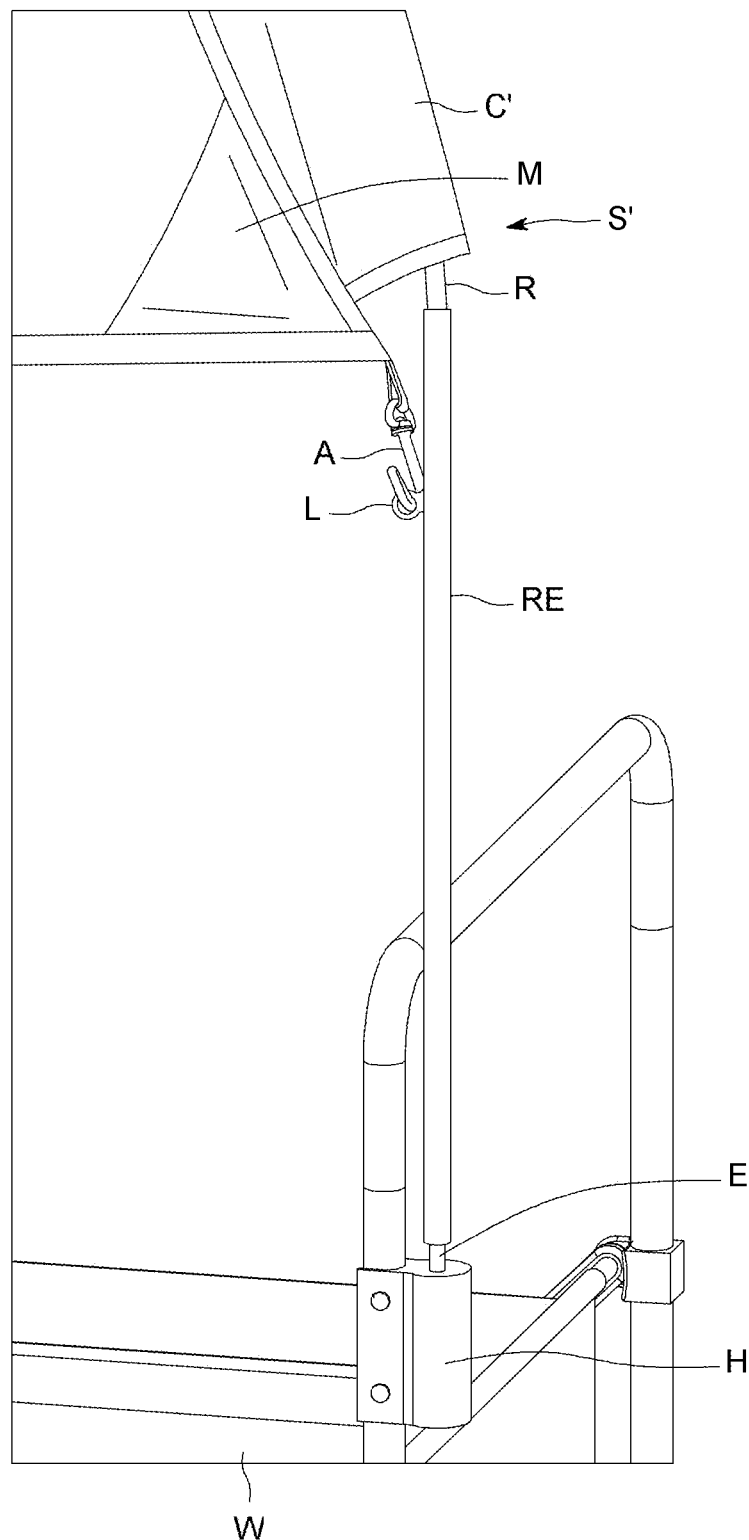

FIGS. 4A and 4B depict installing the shade assembly S to the wagon W, in accordance with one embodiment of the present invention. The end E of the free rod section RE of one long rod R is inserted into the cylindrical hole in the mounting holder H attached to the rear frame RF and the mounting end E of the free rod section RE of the other long rod R is inserted in the cylindrical hole in the mounting holder H attached to the front frame FF, wherein the mounting holders H are aligned only on the same side of the wagon W.

Instead of a mounting holder H having a cylindrical opening receiving the mounting end RE of a long rod R, the end of the long rod R could be hollow to receive a mounting holder in the form of a cylindrical post provided along, e.g., the side of the wagon frame (i.e., the cylindrical post inserted into the mounting end of a long rod). Alternatively, a cylindrical coupling collar may be used to couple the mounting end of a long rod and a mounting holder in the form of a mounting post provided, e.g., along the side of the wagon frame (i.e., the mounting end of the long rod is inserted into one end of the cylindrical coupling collar and a mounting holder in the form of a mounting post is inserted into the other end of the coupling collar).

FIGS. 5A to 5D depict a shade assembly S' in accordance with another embodiment of the present invention. In this embodiment, the canopy C' does not have lose flaps on the sides. The longitudinal guides G' for the two long rods R run along the top of the shade material M. As in the previous embodiment, the frame of the shade assembly S', formed by the long rods R, is supported in a cantilevered fashion by the mounting holders H, to provide lateral shading coverage well beyond the footprint of the wagon W (i.e., the area of the lateral span of the canopy is larger than the total area of the wagon footprint). The shade material M is pulled taut using similar anchoring hooks A and anchoring loops L. The distal ends of the long rods R, being not supported, are free to move (e.g., sway up and down and/or sideways) under the weight of the canopy.

Figure 6B:
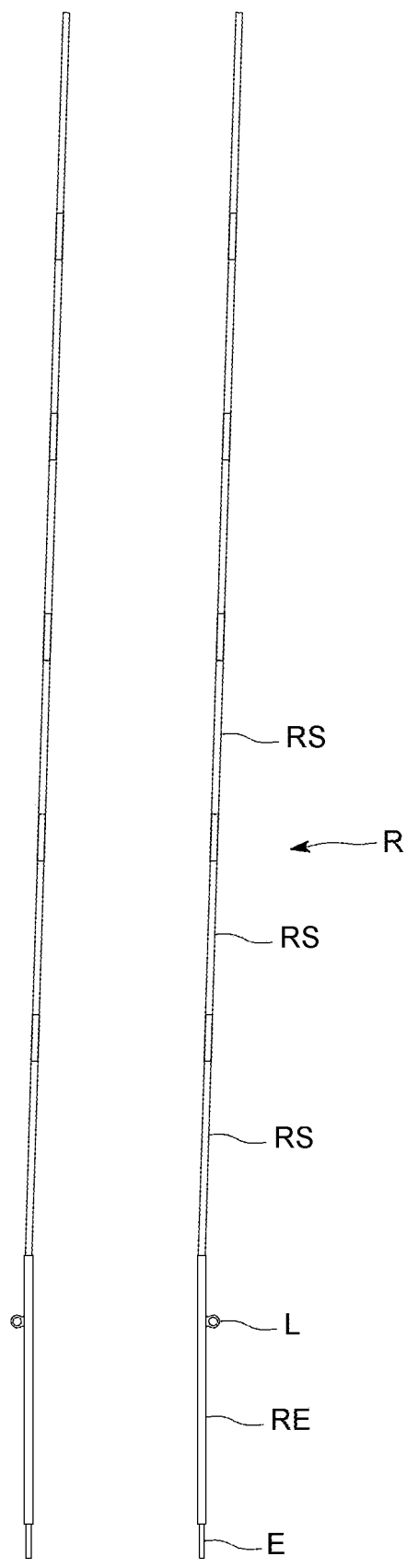

FIGS. 6A and 6B depict the rod sections RS connected together to form the frame of the shade assembly S', and the rod sections RS disconnected for stowing, in accordance with one embodiment of the present invention. In this embodiment, the rod sections RS can also be tethered by an elastic cord CD. The rod sections RS are separate pieces that can be stored in a storage bag. The rod sections RS can be connected end-to-end as depicted in FIG. 6B.

To disassemble the shade assembly S', the long rods RS are pulled out of the guides G' and collapsed by disconnecting the rod sections RS. The shade material M can be folded into a compact form. The folder shade material M and rod sections RS take up little room, which can be stowed in a pocket P provided at the rear frame RF of the wagon W (as was in the embodiment depicted in FIG. 2). The shade assembly S' complements the ease of use and compact configuration of a collapsible wagon.

As can be appreciated from the above description together with the illustrated embodiments, the present invention provides a shade assembly that can be quickly and easily assembled for use and disassembled into a compact form for storage. The frame of the shade assembly as formed by the long rods is supported to extend in a cantilevered manner, from only one/same side of the wagon, providing shade coverage well beyond the footprint of the wagon. The weight of the wagon effectively acts as a support "base" for the two footings of the shade assembly formed by the ends of the long rods. Any content in the wagon would provide additional weight to hold the footings more securely.

It can be appreciated that the mounting holders may be permanently attached (as in the illustrated embodiments) or removably attached to the wagon frames and/or body panels. For example, the mounting holders may be attached to the front frame and rear frame using clamps and/or bolts. Accordingly, existing wagons may be provided with an aftermarket shade accessory based on the present invention.

Having described the invention by the description and illustrations above, it should be understood that these are exemplary of the invention and are not to be considered as limiting. Accordingly, the invention is not to be considered as limited by the foregoing description but includes any equivalents.

The invention claimed is:

1. A shade assembly for a wagon, comprising:
a collapsible shade frame that transitions between an assembled state for providing shade and a disassembled state for stowing, comprising at least a pair of long rods each having a distal end and a mounting end removably mountable to a mounting holder on a frame of the wagon, wherein the long rods each comprises a plurality of rod sections in the disassemble state, and wherein the rod sections are removably connected end-to-end to form corresponding long rods arranged in a cross configuration to form a support frame in the assembled state; and
a canopy comprising a shade material supported on the support frame of the shade frame in the assembled state,
wherein under weight of the canopy, the shade frame is cantilevered at the mounting ends of the long rods by the mounting holder.

2. The shade assembly as in claim 1, wherein the distal ends of the long rods are not supported and are free to move under the weight of the canopy.

3. The shade assembly as in claim 2, wherein the shade frame is flexible in the assembled state to allow bending/bowing to support the shade material to form generally a dome shaped canopy.

4. The shade assembly as in claim 3, the long rods are flexible overall, to apply biasing force on the shade material to keep it taut to form the dome shaped canopy.

5. The shade assembly as in claim 4, wherein the canopy has a lateral span of an area larger than a total area of the wagon footprint.

6. The shade assembly as in claim 5, wherein the mounting holders are located at mounting locations aligned on a same side of the wagon.

7. The shade assembly as in claim 1, wherein the canopy extends with the long rods cantilevered from the mounting holders at mounting locations along a same side of the wagon.

8. The shade assembly as in claim 7, wherein the mounting holders are located at rear and front frames along the same side of the wagon.

9. The shade assembly as in claim 8, wherein the mounting holders each has a cylindrical holder that is sized to receive insertion of the mounting end of the long rod.

10. The shade assembly as in claim 1, wherein the rod sections are coupled by a cord running through all the rod sections of the respective long rods in the disassembled state to facilitate connection of the rod sections in a specific desired order.

11. The shade assembly as in claim 8, wherein the cord is elastic.

12. The shade assembly as in claim 8, wherein the rod sections are made of at least one of aluminum, plastic, carbon fiber, and a combination thereof.

13. The shade assembly as in claim 1, wherein the canopy further comprises guides provided on the surface of the shade material, wherein a first one of the long rods is inserted through the guides in a longitudinal direction from an edge of the shade material, diagonally across the underside and through a center portion of the shade material, and a second one of the long rods is inserted through the guides in a longitudinal direction crossing (e.g., generally orthogonal to) the longitudinal direction of the first one of the long rods, thus forming the cross configuration of the support frame for the shade material.

14. The shade assembly as in claim 13, wherein the guides for the two long rods run along a top surface or a bottom surface of the shade material.

15. The shade assembly as in claim 13, wherein at least one of the rod sections has at least one anchoring loop or anchoring hook, and the shade material has a corresponding anchoring hook or anchoring hoop at a guide near the edge of the shade material to keep the shade material taut to form the dome shaped canopy.

16. The shade assembly as in claim 1, wherein the canopy comprises at least a flap on a side for providing shading from oblique sun rays and/or providing privacy from view from a lateral side.

17. A wagon, comprising:
a wagon frame assembly; and
a shade assembly as in claim 1, removably coupled to the wagon frame assembly.

18. The collapsible wagon as in claim 17, wherein the mounting holders are provided at mounting locations of a front frame and a rear frame, which are aligned on the same side of the wagon.

19. The collapsible wagon as in claim 18, wherein the wagon frame structure is collapsible into a folded structure.

20. The collapsible wagon as in claim 19, wherein the rear frame supports rear wheels at the base of the rear frame, and wherein the collapsible wagon frame assembly further comprises a collapsible frame having a front frame supporting front wheels at a base of the front frame, and a pair of side frames that are each pivotally collapsible, wherein the front frame, the rear frame and the pair of side frames in their extended state define a space for receiving a basket for holding items to be transport by the collapsible wagon.

\* \* \* \* \*